April 18, 1961  H. J. EN DEAN ET AL  2,980,854
PIPELINE SURVEYING
Filed June 28, 1956  2 Sheets-Sheet 1

INVENTORS.
Howard J. EnDean,
John Delbert Jones and
Edward Topanelian Jr.
BY
ATTORNEY INVENTORS.
Howard J. EnDean,
John Delbert Jones and
BY Edward Topanelian Jr.

ATTORNEY

United States Patent Office 2,980,854
Patented Apr. 18, 1961

2,980,854

PIPELINE SURVEYING

Howard J. En Dean, Fox Chapel, Pa., John Delbert Jones, Tulsa, Okla., and Edward Topanelian, Jr., Pittsburgh, Pa., assignors to Gulf Research & Development Company, Pittsburgh, Pa., a corporation of Delaware Filed June 28, 1956, Ser. No. 594,643

5 Claims. (Cl. 324—72)

This invention concerns a method and apparatus for making surveys in pipelines and in particular concerns a method and apparatus for measuring the electrical potential gradient along a transportation pipeline ot which access may be had to the inside only.

Pipelines are generally in contact with the ground and necessarily pass through a variety of soil conditions. The pipe is generally buried although some parts of the line may be suspended above ground. Parts of the line may be submerged under water as in stream crossings and other parts of the line may be in arid, sandy soil. In addition the acidity of the soil in contact with the pipe may vary over wide limits, and furthermore stray electric currents may enter the line, follow it for considerable distance and again leave in another area. All of these conditions tend to set up electrolytic currents in the pipeline which may cause severe corrosion. It is customary to minimize corrosion by electrically insulating the pipe by means of wrappings and coatings but these expedients often accentuate the trouble by restricting current flow to defects in the coating (called "holidays") with the result that extremely rapid corrosion occurs at the defect. Cathodic protection is extensively used on pipelines but it is often times difficult to ascertain the best distribution of anodes to reduce corrosion to a minimum.

In order to reduce the electrolytic corrosion of the pipeline it is essential to know in detail the variation of electric current flow in the pipe. This can be determined by measurements of potential gradient in the pipe. If a potential gradient exists there will be a corresponding current flow and any change in the gradient indicates that current has entered or left the pipe.

It is the purpose of this invention to provide a method and apparatus for measuring and recording the electrical potential gradient along a pipeline. This invention is applicable to any pipeline used for transportation purposes and through which fluid materials are forcibly caused to flow. In the method of this invention an instrumentality including means for measuring and recording potential differences is placed in the pipeline and caused to traverse the inside of the pipe by the transported fluid entirely free of any physical connection to the ends of the pipeline. In the method of this invention instrumentality which provides the survey is pumped through the pipe, that is, it is caused to traverse the pipeline by motion of the transported fluid. By means of this invention the entire pipeline may be tested as frequently as desired and without introducing wires, lines, or other extraneous means into the pipe and without interfering with the normal operation of the pipeline.

It is an object of this invention to provide an apparatus which may be freely pumped from one end of the pipeline to the other and which records the electrical potential gradient along the pipeline during its traverse therethrough and which simultaneously records some other parameter which is indicative of the position along the traverse.

It is a further object of this invention to provide an apparatus which may be freely pumped from one end of the pipeline to the other and which records the electrical potential gradient along the pipeline as a function of elapsed time.

It is a further object of this invention to provide an apparatus which may be freely pumped from one end of a pipeline to the other and which records the electrical potential gradient along the pipeline as a function of distance traversed in the pipeline.

It is a further object of this invention to provide an apparatus which may be freely pumped from one end of a pipeline to the other and which records the electrical potential gradient along the pipeline as a function of the local pressure in the pipeline.

It is a further object of this invention to provide an apparatus which may be freely pumped from one end of a pipeline to the other and which records the electrical potential gradient along the pipeline as a function of the number of pump-stroke impulses which reach the apparatus.

It is a further object of this invention to provide an apparatus which may be freely pumped from one end of a pipeline to the other and which records the electrical potential gradient along the pipeline as a function of the number of pipe joints traversed.

These and other useful objects are accomplished by this invention in the manner described in the specification of which the drawings form a part and in which Figure 1 shows a diagrammatical view of an apparatus of this invention partly in section for recording the electrical potential between two spaced points on the inside wall of the pipeline as a function of time;

The invention comprises a carrier which may be pumped through the pipeline, said carrier having means for measuring electrical potential difference between points on the inside wall of the pipeline, means for measuring a parameter which is indicative of the position of the carrier in its traverse through the pipeline, and means for recording the correlation between indications of the potential-difference-measuring apparatus and the apparatus which measures the position-indicating parameter.

Figure 1:
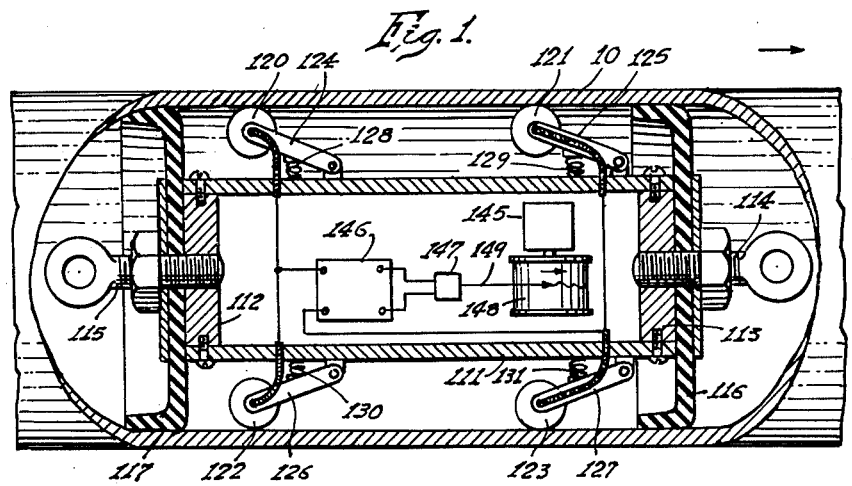

Referring to Figure 1, 10 represents a pipeline the front side of which has been cut away to show the apparatus inside the pipeline. The apparatus comprises a tubular carrier 111 preferably made of insulating material and having end plates 112 and 113 which may be fastened to the tube 111 by means of screws as illustrated. The space inside the carrier is sealed to prevent entrance of pipeline fluid and will normally be filled with air at atmospheric pressure. Bolts 114 and 115 are threaded into end plates 112 and 113 and serve to clamp rubber cup-shaped packers 116 and 117 to each end of the carrier 111. The packers comprise rubber cups clamped to the bolts as by means of nuts and washers as illustrated. The packers 116 and 117 form a sliding seal against the pipeline wall and serve as means by which the pumped fluid causes the apparatus to traverse the pipeline. The bolts 114 and 115 may have eyes which serve as convenient aids for recovering the carrier should it accidentally become stuck in the pipeline. Alternatively a stuck carrier may be recovered by pushing it through the pipeline with a succeeding carrier. While means for mounting the packers is shown to comprise a single axial bolt, it is apparent that more than one such bolt may be used at each end of the carrier as desired. For use in large pipelines the packers 116 and 117 may be annular in shape and the bolts 114 and 115 may be replaced by a series of peripheral bolts (not shown) which serve to clamp the annular cup-shaped packer between annular rings (not shown). The apparatus is launched in the pipeline through a customary scraper trap and upon entering the pipeline is carried therethrough by the normal movement of the pumped fluid.

The carrier 111 is provided with four contact wheels 120, 121, 122 and 123. These wheels are preferably made of a metal which is not affected by the liquid in the pipeline in order that they themselves do not set up erroneous potential differences. The wheels have sharp edges which cut through any deposits on the inside of the pipe. Each wheel is carried on an arm 124, 125, 126, and 127 which arms are made of electrically-insulating material such as Bakelite or other plastic. The arms are pivotally mounted on the carrier 111 as diagrammatically indicated in the figure, and the arms are urged outward by the springs 128, 129, 130, and 131. Electrical contact to each respective wheel is made by means of a spring brush which is mounted on the respective arm, and which bears against the respective metallic axle of the wheel thereby electrically contacting the same. A lead wire is connected to each brush and is provided with sufficient slack to permit radial motion of the wheel. Each lead wire passes through the housing 111 and connects inside the housing to one terminal of a recording potentiometer 146 in the manner shown.

Whereas Figure 1 shows two contact wheels 120 and 122 connected together and located on the same transverse plane, it is contemplated that any number of contact wheels in a given transverse plane may be employed, although only one wheel would suffice. In Figure 1 the contact wheels in any one transverse plane are connected together to form substantially a single contact point whose potential will be substantially the average electrical potential around the pipe at the transverse plane. The second set of wheels 121 and 123 is located in a transverse plane spaced some distance from the plane of wheels 120 and 122, and the wheels 121 and 123 are also connected together by their respective lead wires and to the other terminal of recording potentiometer 146. The potential difference between the two sets of wheels is measured by the recording potentiometer 146 whose indicator 147 records on a chart carried on drum 148 by means of a pen 149. The recording drum 148 is driven by a clock motor 145 which may be spring driven. The record thus obtained shows the potential difference between two transverse planes of the pipeline, the distance between the planes being the same as that between the two sets of contact wheels, and this potential difference is recorded as a function of elapsed time during the traverse of the apparatus through the pipeline. The drum 148 is provided with a recording chart which may be removed for study when the apparatus is recovered at a scraper trap at the receiving end of the line. Deflections of the recording potentiometer 146 may be recorded by the pen 149 as positive or negative about the midline of the recording chart 148. The recorded potential difference is proportional to the potential gradient in the metal pipe and one may determine the direction and magnitude of electric currents flowing in the pipeline therefrom in well-known manner. From the distribution and variation of these currents one may ascertain the points where excessive corrosion is likely to occur, whereupon appropriate steps may be taken to correct the condition. Inasmuch as the instrument traverses the pipeline at a rate that is determinable from the rate of fluid transport through the pipeline, its location at any time may readily be computed. If the fluid is pumped at a uniform volumetric rate through uniform pipe, then the pipeline distance to any desired point on the record bears the same relation to the total length of the traverse as the elapsed time from the start of the record until the desired point on the record bears to the total elapsed time of the traverse.

Figure 2:
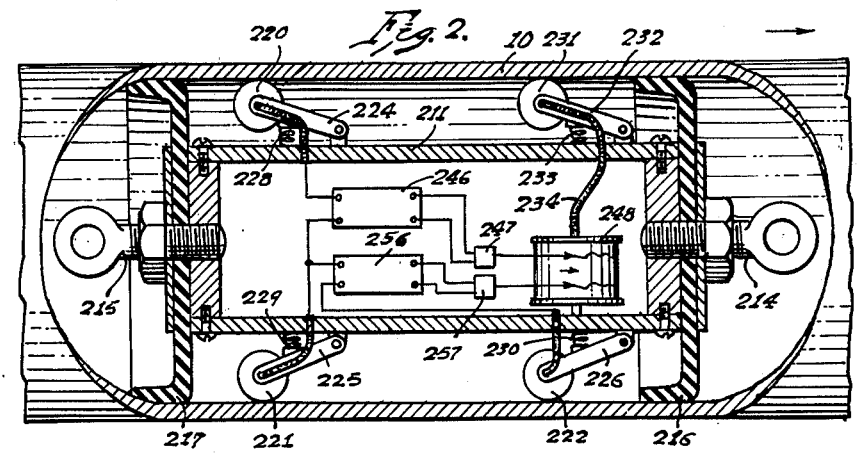
Figure 2 shows a diagrammatical view of an apparatus of this invention partly in section for recording the electrical potential between two spaced points on the inside wall of the pipeline as a function of distance traversed through the pipeline.

Figure 2 shows an apparatus for recording both the longitudinal and transverse gradients in the pipeline as a function of the traverse distance. The apparatus of Figure 2 is similar to that of Figure 1 and comprises the cylindrical carrier 211 with bolts 214 and 215 holding the packers 216 and 217. Three contact wheels 220, 221, and 222 are mounted on insulated arms 224, 225 and 226, which are pivotally mounted on the housing and urged outward by means of springs 228, 229 and 230 respectively. Electrical connection to the wheel in each case is made by a spring brush pressing against the metal axle of the wheel, and an electrical lead is brought from each brush into the housing 211. Two recording potentiometers 246 and 256 are used to measure potentials. Potentiometer 246 is connected to wheels 220 and 221 and measures the potential difference between wheels 220 and 221. The potentiometer 256 is connected to wheels 221 and 222 and measures the potential difference between wheels 221 and 222. The indicators 247 and 257 are connected respectively to the potentiometers 246 and 256 and record by means of pens on the chart of drum 248.

In Figure 2 an odometer wheel 231 is carried on an arm 232 which is hinged on the carrier 211. A spring 233 between the arm and the carrier urges the arm outward so that the odometer wheel 231 is always in contact with the pipeline wall. The axle of the wheel 231 engages a flexible drive shaft 234 which serves to transmit rotattion of the odometer wheel to inside the carrier. Inside the housing the flexible shaft 234 is connected to rotate the recording drum 248. The embodiment of the invention shown in Figure 2 thus provides a record of the longitudinal potential gradient (taken between wheels 221 and 222) and also of the transverse potential gradient (taken between wheels 220 and 221) in the pipeline at each point of the pipeline traverse. The apparatus inside the carrier 211 may be so disposed that the carrier is heavier on one side than the other so that gravity maintains it in a fixed orientation about its longitudinal axis, and the wheels 220 and 221 are thus maintained in a fixed orientation with respect to the horizontal.

Figure 3:
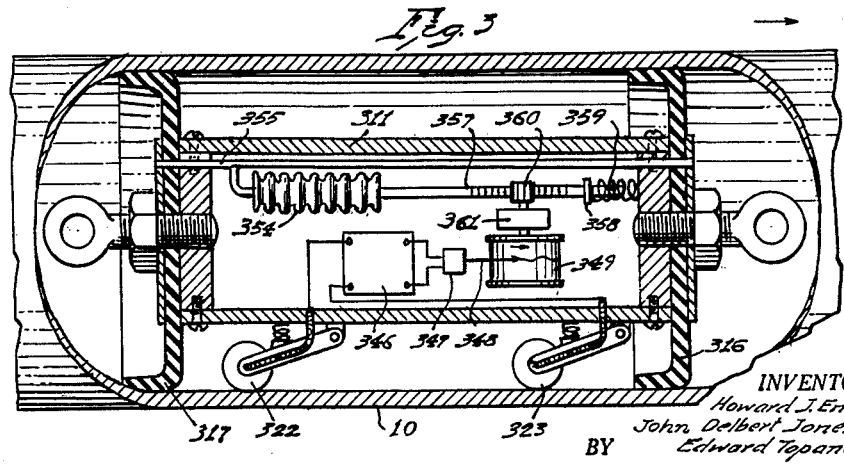
Figure 3 shows a diagrammatical view of an apparatus of this invention partly in section for recording the electrical potential between two spaced points on the inside wall of the pipeline as a function of the local pressure in the pipeline.

Figure 3 shows a diagrammatical view of an embodiment of the invention in which the recording chart is driven by the pressure drop in the pipeline. Inasmuch as pressure in a pipeline varies in a continuous manner from its input end to its output end, there is a correspondence between absolute or gauge pressure and location along the pipeline. This correspondence is employed in Figure 3 to correlate potential difference measurements with position along the pipeline. As described in the previous figures the cylindrical carrier 311 is equipped with packers 316 and 317 by means of which the pipeline fluid serves to propel the device through the pipeline. A pair of contact wheels 322 and 323 are connected to a recording potentiometer 346 having indicator 347 and recording pen 348 as described in connection with the previous figures.

In order to drive the record drum 349 in proportion to pressure drop, bellows 354 is connected by means of duct 355 to the pipeline so that the pressure in the pipeline serves to expand bellows 354. The end of the bellows 354 is fastened to a rack 357 which has at its other extremity a collar or pin 358 which serves as an abutment for compression spring 359. Expansion of the bellows 354 thus compresses spring 359. A pinion 360 transmits motion of the rack through a gear box 361 to the recording drum 349. As the pressure drops when the apparatus moves away from the input end of the pipeline, the spring 359 expands and motion of the rack 357 turns the record drum 349. By means of the embodiment of Figure 3 a record is obtained which shows potential differences (i.e. gradients) along the pipe line as a function of the pressure drop along the pipeline. Inasmuch as the pressure drop from the input to the output end of the pipeline is substantially a linear function of distance, it is possible to determine the location of any desired point on the record by simple calculation.

Figure 4:
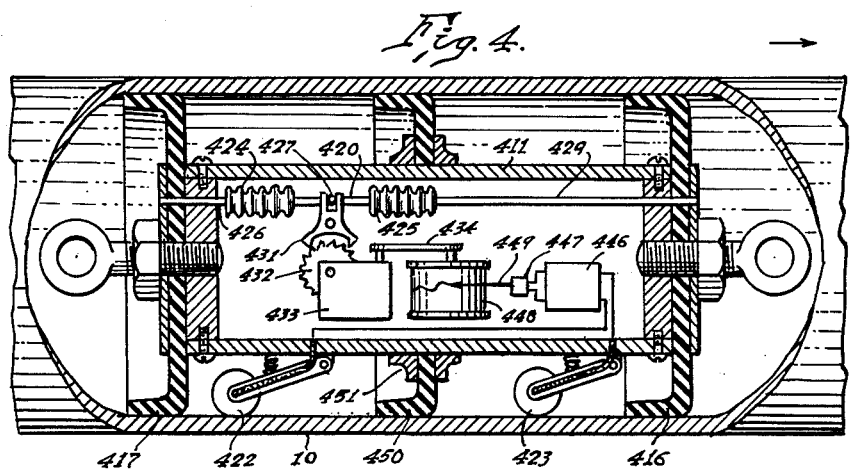
Figure 4 shows a diagrammatical view of an apparatus of this invention partly in section for recording the electrical potential between two spaced points on the inside wall of the pipeline as a function of the number of pump-stroke impulses received at the apparatus.

Figure 4 shows an embodiment of this invention in which the potential difference along the pipeline is recorded as a function of the number of pump-stroke impulses received by the apparatus. The carrier 411 is equipped with packers 416 and 417 and the contact wheels 422 and 423 are mounted in substantially the same manner as described in the previous figures. The potential difference between wheels 422 and 423 is measured by potentiometer 446 and indicator 447 connected thereto records on drum 448 by means of pen 449 in the same manner as previously described. In the operation of a transportation pipeline which employs reciprocating pumps it is known that each stroke of the pump produces a pressure impulse which travels down the pipeline. The fluid motion and hence the motion of the carrier 411 which accompanies each stroke of the pump is known from the pump displacement. Since the cross-sectional area of the pipe is also known, it is apparent that the distance along the pipeline may be measured in terms of the number of pump-stroke impulses received by the apparatus after it is launched in the pipeline. For this purpose the embodiment of Figure 4 has differentially-connected bellows 424 and 425 having a rigid connection 420 between them. Bellows 424 is connected by means of duct 426 with the space behind the carrier. The other bellows 425 is connected by means of duct 429 to the space ahead of the carrier. Each time a pressure impulse is received at the apparatus there will occur a momentary deflection of the pin 427 on the connection 420. Motion of the pin 427 effects rocking of the anchor 431 which allows the escapement of one tooth of pallet wheel 432. The pallet 432 and anchor 431 form the escapement of a spring-driven motor 433 which is connected to rotate drum 448 by gears or drive chain 434. In this manner the drum 448 is advanced a fixed amount for each pump-stroke impulse. In order to insure that the pump-stroke pressure impulses actuate the escapement an additional annular packer 450 may be mounted on the carrier 411 as by means of flanges 451 located between the wheels 422 and 423. The packer 450 will offer additional friction and snubbing action to the motion of the carrier so that the pressure impulses will be more effective. The embodiment of Figure 4 gives a record which shows the potential difference along the pipeline as a function of the integrated number of pump strokes received by the apparatus, the latter being directly proportional to the distance traversed through the pipeline.

Figure 5:
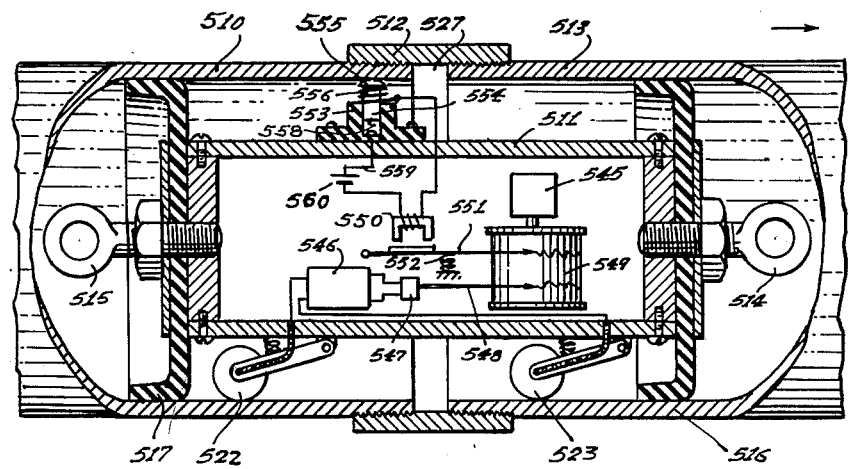
Figure 5 shows a diagrammatical view of an apparatus of this invention partly in section for recording the electrical potential between two spaced points on the inside wall of the pipeline as a function of the number of pipe joints traversed.
Figure 6:
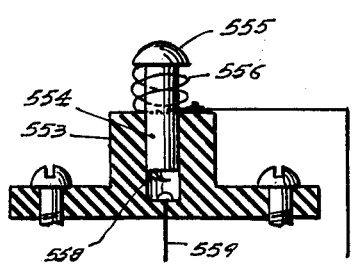
Figure 6 shows an enlarged view of the means employed in the apparatus of Figure 5 for sensing pipe joints.

Figure 5 shows an embodiment of the invention useful for recording the potential difference along the pipeline as a function of the number of pipe joints traversed. The carrier 511 is equipped with packers 516 and 517 which are clamped between nuts and washers on the eyebolts 514 and 515 as shown in the previous figures. Contact wheels 522 and 523 are mounted on insulating arms as in the previous figures described above and are connected to a recording potentiometer 546 whose indicator 547 records on drum 549 by means of pen 548. The drum 549 is driven by means of a spring-driven clock motor 545. A pipe-joint recorder also records on drum 549 and comprises a magnetically actuated pen 551 biased by a tension spring 552. An insulating holder 553 (better shown in Figure 6) is mounted on the outside of carrier 511 and carries in an axial bore a plunger 554 with a conical or dome-shaped head 555. The head 555 is forced into mechanical contact with the wall of the pipe by a compression spring 556 and electrical connection is made to the plunger 554 through the spring and an insulated terminal in the wall of the carrier. The inner end of plunger 554 is provided with a contact 558 which normally contacts another contact at the bottom of the axial hole in the holder 553 and which is connected to the pen-activating circuit. The length of plunger 554 is adjusted to close the circuit from the contact 558 to the wire 559 when the apparatus is located in the pipeline. The electrical circuit comprises battery 560, the pen actuator 550, and the contact 558. This circuit is broken whenever the head 555 of the plunger moves outward into the annular space between pipe joints.

In Figure 5 the means for correlating the potential difference measurement with position in the pipeline is adapted to be used in a pipeline which is made in segments such as 510 and 513 coupled together by collar 512. In this type of construction the successive pipe sections do not quite meet and there is an annular recess 527 which marks each joint. In the embodiment of Figure 5 the apparatus is equipped with means for sensing the annular recesses 527 as described above. By means of this apparatus a mark is made on the recording drum 549 for each joint of pipe traversed. It is not essential in this embodiment that the record chart be moved exactly in proportion to time and hence the spring motor 545 need not keep perfect time. While the apparatus of Figure 5 is particularly adapted for determining position in a pipeline having collared joints, it may also be used in certain types of welded-joint pipe where a small annular groove remains at the weld.

Whereas the various embodiments of the invention illustrated in Figures 1 to 4 produce a record of potential gradient as a function of elapsed time, distance, local pressure, and a number of pump-stroke impulses all of which are indicative of location along the pipeline, other means of correlating the potential gradient with these parameters may be employed. Thus, for example, one of these parameters may be recorded on the same record drum with the potential gradient similar to that shown in Figure 5. In this event the record drum is driven by a spring motor. In this manner as well as in the specific manner illustrated the correlation is recorded between the indication of the potential-gradient-measuring apparatus and the indication of the position-indicating-parameter measuring means.

Certain aspects of this invention are disclosed and claimed in copending applications Ser. Nos 594,405 now abandoned; 594,482; 594,483; 594,541 now Patent No. 2,834,113; 594,577 now Patent No. 2,924,966; 594,641 now Patent No. 2,884,624; and 594,642 now abandoned; all of which are by the same applicants and are assigned to the same assignee as the present application.

It is contemplated that the apparatus disclosed herein may be operated in conjunction with other apparatus for example that disclosed in the aforementioned copending applications in order to make two or more simultaneous surveys of different parameters of the pipeline. For making such a multi-purpose survey of the pipeline, it is within the purview of this invention to provide a train of instrumentalities without packers and which may be tied together with couplers, the train being pulled by one or more motive units with the motive unit equipped with one or more packers which serve to allow the pumped fluid to push the motive unit through the pipeline, thereby causing the entire train to traverse the pipeline. In such a train the packer on the motive unit is equivalent to a packer on the instrument vehicle since it serves as the means by which the pumped fluid causes the vehicle to traverse the pipeline.

It is also contemplated that prior to running the appartus disclosed herein, one or more scrapers or other known cleaning devices may be pumped through the pipeline in order to prepare the pipeline for a survey. It is further contemplated that any of the devices shown herein may itself be equipped with one or more scraper sections if such is necessary to obtain a reliable survey. Furthermore, the number of packers used on the instrument carrier may be varied to suit conditions and in some cases it will suffice to use but a single packer together with one or more guides to maintain the longitudinal axis of the apparatus in proper alignment with the axis of the pipe.

What we claim as our invention is:

1. In apparatus for surveying the inside of a pipe for electrical potential gradients comprising a vehicle insertable in the pipe, a packer connected to the vehicle adapted to form a sliding seal against the wall of the pipe, potential difference measuring means in the vehicle, and recording means in the vehicle connected to the potential-difference measuring means recording the indications thereof, the improvement which comprises two electrically conducting contact members mounted on said vehicle, said contact members being electrically insulated and contacting the pipe at transversely spaced points lying in a plane substantially perpendicular to the longitudinal axis of the pipe, and means connecting said contact members respectively to the terminals of said potential-difference-measuring means.

2. In apparatus for surveying the inside of a pipe for a parameter thereof comprising a vehicle insertable in the pipe, means in the vehicle measuring a parameter of the pipe, and recording means in the vehicle including a record chart on which values of the measured parameter are recorded, the improvement which comprises pressure responsive means in said vehicle communicating with the fluid in the pipe, said pressure responsive means being connected to said recording means to drive said record chart.

3. In apparatus for surveying the inside of a pipe for a parameter thereof comprising a vehicle insertable in the pipe, means in the vehicle measuring a parameter of the pipe, and recording means in the vehicle including a record chart on which values of the measured parameter are recorded, the improvement which comprises pressure-impulse-detecting means in said vehicle communicating with the fluid in the pipe behind said vehicle, means in said vehicle connected to said pressure-impulse-detecting means adapted to integrate the number of detected pressure impulses, said integrating means being connected to said recording means to drive said record chart in proportion to the integrated number of detected pressure impulses.

4. In apparatus for surveying the inside of a pipe for a parameter thereof comprising a vehicle insertable in the pipe, means in the vehicle measuring a parameter of the pipe, and recording means in the vehicle including a record chart on which values of the measured parameter are recorded, the improvement which comprises feeler means on said vehicle adapted to detect joints in the pipe, means in said vehicle connected to said feeler means adapted to integrate the number of detected pipe joints, said integrating means being connected to said recording means to drive said record chart in proportion to the integrated number of detected pipe joints.

5. In apparatus for surveying the inside of a pipe for electrical potential gradients comprising a vehicle insertable in the pipe, a packer connected to the vehicle adapted to form a sliding seal against the wall of the pipe, potential difference measuring means in the vehicle, and recording means in the vehicle connected to the potential-difference-measuring means recording the indications thereof, the improvement which comprises two electrically conducting contact members mounted on said vehicle, said contact members being electrically insulated and contacting the pipe at transversely spaced points lying in a plane substantially perpendicular to the longitudinal axis of the pipe, means connecting said contact members respectively to the terminal of said potential-difference-measuring means, and gravity actuated means on said vehicle maintaining the orientation thereof about a longitudinal axis.

References Cited in the file of this patent
UNITED STATES PATENTS

| | | |
|---|---|---|
| 2,220,881 | Barnes et al. | Nov. 12, 1940 |
| 2,338,991 | Arnold | Jan. 11, 1944 |
| 2,371,658 | Stewart | Mar. 20, 1945 |
| 2,601,248 | Brenholdt | June 24, 1952 |
| 2,665,187 | Kinley et al. | Jan. 5, 1954 |
| 2,672,050 | Sewell | Mar. 16, 1954 |
| 2,776,564 | Montgomery et al. | Jan. 8, 1957 |
| 2,782,370 | Ver Nooy | Feb. 19, 1957 |